(12) United States Patent
Demaj et al.

(10) Patent No.: US 9,350,415 B2
(45) Date of Patent: May 24, 2016

(54) PROCESS FOR ASSIGNING A FINGER OF A RAKE RECEIVER IN IDLE MODE, AND APPARATUS FOR CARRYING OUT THE PROCESS

(75) Inventors: Pierre Demaj, Nice (FR); Fabrizio Tomatis, Saint Laurent du Var (FR); Eric Alliot, Mouans (FR)

(73) Assignee: ST-ERICSSON SA, Plan-les-Ouates (CH)

( * ) Notice: Subject to any disclaimer, the term of this patent is extended or adjusted under 35 U.S.C. 154(b) by 366 days.

(21) Appl. No.: 13/256,406

(22) PCT Filed: Mar. 11, 2010

(86) PCT No.: PCT/EP2010/001524
§ 371 (c)(1),
(2), (4) Date: Sep. 13, 2011

(87) PCT Pub. No.: WO2010/102813
PCT Pub. Date: Sep. 16, 2010

(65) Prior Publication Data
US 2012/0002706 A1 Jan. 5, 2012

(30) Foreign Application Priority Data
Mar. 13, 2009 (FR) ...................................... 09 01171

(51) Int. Cl.
*H04B 1/707* (2011.01)
*H04B 1/7117* (2011.01)
*H04B 1/7075* (2011.01)
*H04B 1/7113* (2011.01)

(52) U.S. Cl.
CPC .......... *H04B 1/7117* (2013.01); *H04B 1/70754* (2013.01); *H04B 1/70755* (2013.01); *H04B 1/7113* (2013.01)

(58) Field of Classification Search
CPC ............................ H04B 1/7117; H04B 1/7113
USPC ................. 375/227, 348, 144, 148, 326, 149; 455/506, 296
See application file for complete search history.

(56) References Cited

U.S. PATENT DOCUMENTS

| | | | |
|---|---|---|---|
| 6,680,967 B1 * | 1/2004 | Westman | 375/148 |
| 6,813,309 B1 * | 11/2004 | Ogino | 375/148 |
| 7,340,017 B1 * | 3/2008 | Banerjee | 375/348 |
| 7,738,889 B2 * | 6/2010 | Nakada | 455/506 |
| 2002/0012384 A1 * | 1/2002 | Berens | 375/144 |
| 2003/0152167 A1 * | 8/2003 | Oh et al. | 375/326 |
| 2004/0028121 A1 * | 2/2004 | Fitton | 375/144 |

(Continued)

FOREIGN PATENT DOCUMENTS

| | | |
|---|---|---|
| EP | 0756391 A1 | 1/1997 |
| EP | 1126627 A2 | 8/2001 |
| EP | 1363406 A1 | 2/2002 |

*Primary Examiner* — Ross Varndell
(74) *Attorney, Agent, or Firm* — Coats & Bennett, PLLC

(57) ABSTRACT

Process of a finger assignment in a rake receiver for a wireless communication device comprising the following steps: —detection (21) of a pilot (CPICH) and the comparison of its energy according to a first threshold value; —detection (22), on the basis of said first threshold value, of a first significant path; —assignment (23) of said first significant path to a first finger of the rake receiver; —determination (24) of an observation window; —application (25) of a second threshold value, distinct and lower than said first value, for the detection of secondary paths; —rake fingers assignment to secondary paths detected.

10 Claims, 4 Drawing Sheets

(56) References Cited

U.S. PATENT DOCUMENTS

2005/0254563 A1* 11/2005 Arima .......................... 375/227
2007/0041431 A1* 2/2007 Reial .................... H04B 1/7113
                                                        375/147
2007/0195864 A1* 8/2007 Jonsson et al. ................ 375/148

* cited by examiner

PROCESS FOR ASSIGNING A FINGER OF A RAKE RECEIVER IN IDLE MODE, AND APPARATUS FOR CARRYING OUT THE PROCESS

TECHNICAL FIELD

The present invention relates to the field of wireless communications, in particular to third generation and more specifically to a process for assigning fingers of a rake receiver to reflection paths.

BACKGROUND ART

As it is known, in wireless communication, a signal is often the object of dispersions, reflections, fading etc. . . . , causing the reception, within the receiver, of a multiplicity of signals shifted from one another, in many paths.

One treats these reflections, multiple dispersions of a signal by means of a rake receiver, which comprises a multiplicity of units (fingers) for the treatment of the various reflections, shifted one another, in order to allow, after treatment, the summation of all the elementary contributions of the reflections resulting from the multiple paths.

FIG. 1 illustrates the situation of a User Equipment 2 comprising a rake receiver 3 designed to process a number N of reflection paths distinct from the same signal emitted by a base station 1. For the sake of clarity, only three paths, respectively 11-13, are illustrated in FIG. 1 and represent three distinct contributions from the same signal arriving at shifted moments within the receiver, and with different amplitudes.

The communication protocols and in particular 3GPP require that a User equipment switches between idle and operating phases so as to avoid to miss a call signal coming from the base station. In this respect, it is important, in an obvious concern of economy of the lifespan of the battery, where the phase of operating lasts a minimal time and that, consequently, the process of assignment of various "fingers" of the rake receiver is carried out as soon as possible.

Generally, the fingers assignment of a rake receiver is carried out by means of a detection mechanism of a pilot ("Common Pilot Channel" (CPICH)) and of its possible reflections. For this purpose a measurement of the energy of the received signal is performed and a comparison with a threshold value, as that illustrated in FIG. 2, for detecting the various reflection paths. FIG. 2 shows that, after a first significant path of great amplitude corresponding to direct reception of the signal (Line of Sight), two reflection paths with less energy succeed. The mechanism of threshold detection is regulated so as to avoid the false detections (Constant False Alarm Rate (CFAR)), but it can omit one or more paths having less energy, as it is the case of the $2^{nd}$ reflection in FIG. 2.

In order to maintain the efficiency of the process, one may consider to increase the processing time of the paths, which increase might clearly jeopardize the duration of the life of the battery.

For this reason, one wishes to be able to have a more effective process, being able to satisfy a reduced operation duration.

SUMMARY OF THE INVENTION

The object of the present invention is to carry out a new process of detection of reflection paths and fingers assignment of a rake receiver to the various detected paths.

Another object of this invention consists in achieving a process and a device of detection of reflection paths likely to reduce electricity consumption and to prolong the lifespan of the battery.

It is another object of this invention to provide a cell phone presenting an improved technique of paging for detection of the reflection paths and for attribution of the fingers of the rake receiver.

The invention achieves these objects by means of a process of assignment of a finger in a rake receiver for a wireless communication device comprising the steps of:
  detection of a pilot (CPICH) and the comparison of his energy according to a first threshold value;
  detection, on the basis of said first threshold value, of a first significant path;
  assignment of said first significant path to a first finger of the rake receiver;
  determination of an observation window;
  application of a second threshold value, distinct and lower than said first value, for the detection of secondary paths;
  rake fingers assignment to secondary paths detected.

In an embodiment, the window of observation is fixed. Alternatively, it could be variable.

The invention also carries out a rake receiver for a wireless communication device including:
  means of detection of a pilot (CPICH) and the comparison of its energy according to a first threshold value;
  means of detection, on the basis of said first threshold value, of a first significant path;
  means for assigning said first significant path to a first finger of the rake receiver;
  means for determining an observation window;
  means of detection of secondary paths based on a second threshold value lower than said first threshold value;
  means for assigning rake fingers to said secondary paths detected.

The invention is particularly adapted to the embodiment of a cell phone or device or yet to a device of a Personal Digital Assistant (PDA).

DESCRIPTION OF THE DRAWINGS

Other characteristics, objects and advantages of the invention will appear with the reading of the description and the drawings hereinafter, only given as nonrestrictive examples. On the annexed drawings.

DESCRIPTION OF THE PREFERRED EMBODIMENT

Figure 1:
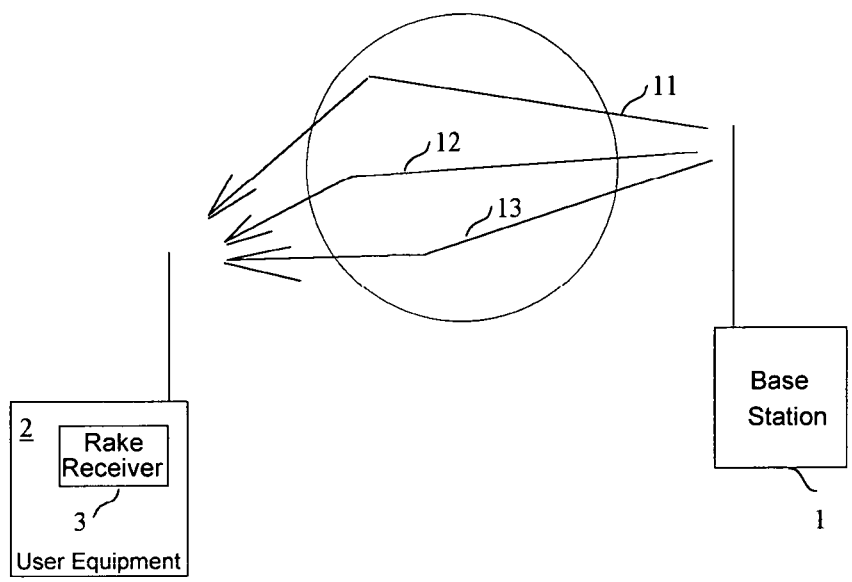
FIG. 1 illustrates the essential function of a rake receiver
Figure 2:
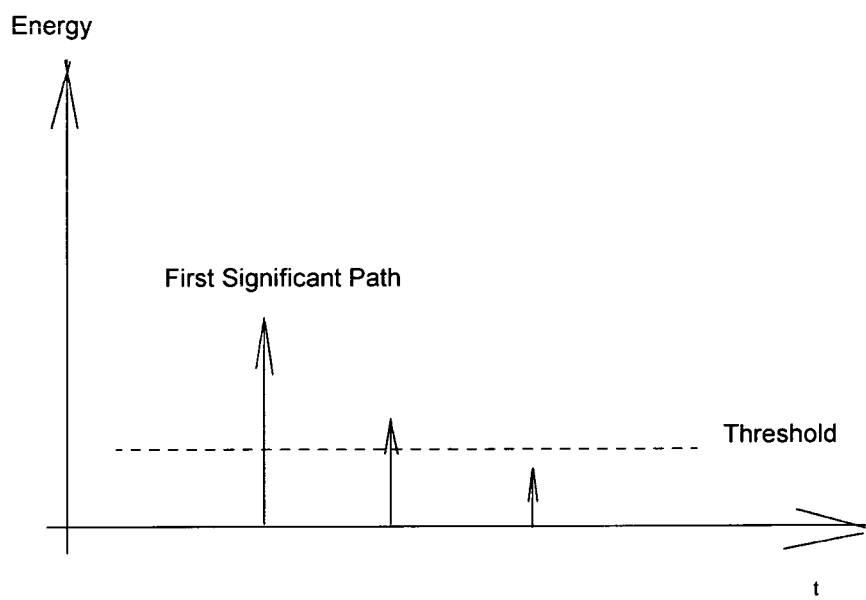
FIG. 2 illustrates the detection of the paths of a same signal
Figure 3:
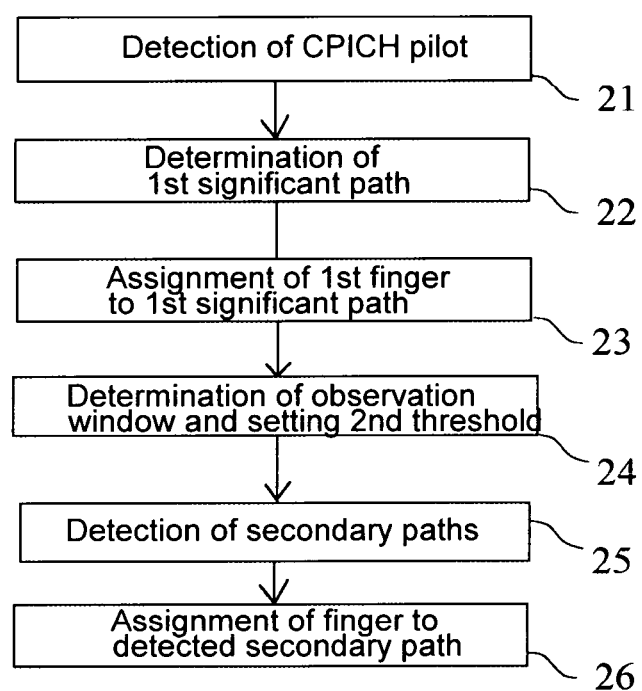
FIG. 3 illustrates a process of paths detection and fingers assignment of the rake receiver in conformity with the present invention.

A process of assignment of a finger of a rake receiver to a reflection path given in the case of a mobile phone or user equipment for a 3GPP network for example, is described. Clearly, the process described hereinafter applies to a mobile phone but it could also be applied to any mobile device comprising wireless communication functionalities, such as, in particular, a Portable Document Assistant etc. . . . . The invention can be realized by means of digital circuits and/or using microprocessors ordered by programs or microprograms. Moreover, the device can comprise means of input/output like a screen of posting, a keyboard, a microphone and an exit audio or ear-phones.

In addition, the mobile phone comprises means of hardware and software, allowing to implement a rake receiver comprising a certain number of units or fingers, for example 6 or 8 fingers, allowing the individual treatment of a particular path.

The device or mobile phone also comprises a detector of paths allowing to identify a plurality of paths emanating from the base station on the basis of detection of shifted reflections of a pilot signal. Such a path detector is well-known to a man skilled in the art and will not be further described. It suffices to recall that this detector comprises means allowing to correlate the flow of data entering with an predefined signal or pilot. The path detector measures the energy level and the temporal shift of a plurality of signals received from the base station.

Finally, the device or mobile phone comprises means allowing to assign the fingers of the rake receiver to different paths identified by the path detector.

It will now be described a process of fingers assignment of a rake receiver to different paths identified in accordance with the present invention. For the implementation of this process, one will be clearly able to use hardware and/or software circuits (hardware/software).

In a step 21, the process comprises the detection, in accordance with conventional techniques, of a pilot of the type ("Common Pilot Channel" (CPICH)) and performs the measurement of its power or energy. The detection of the pilot is done by means of a detection mechanism based on a conventional threshold.

Then, in a step 22, the process proceeds to the determination, on basis of the detection of the previously mentioned pilot, of first significant path corresponding to a maximum energy.

Then in a step 23, the process proceeds to the assignment of first finger of rake receiver with first significant path detected in the step 22.

The process then continues with a step 24, during which it determines an observation window in which the threshold of detection of CPICH detector is positioned on a second value, distinct from the first value having been used for detection of first significant path.

In one embodiment, the observation window is fixed at a constant value. Alternatively, one could envisage a variable width.

Then in a step 25, the process applies the second value of the threshold for proceeding with the detection of secondary paths.

Then in a step 26, the process updates the rake fingers assignment on the secondary paths detected.

Figure 4:
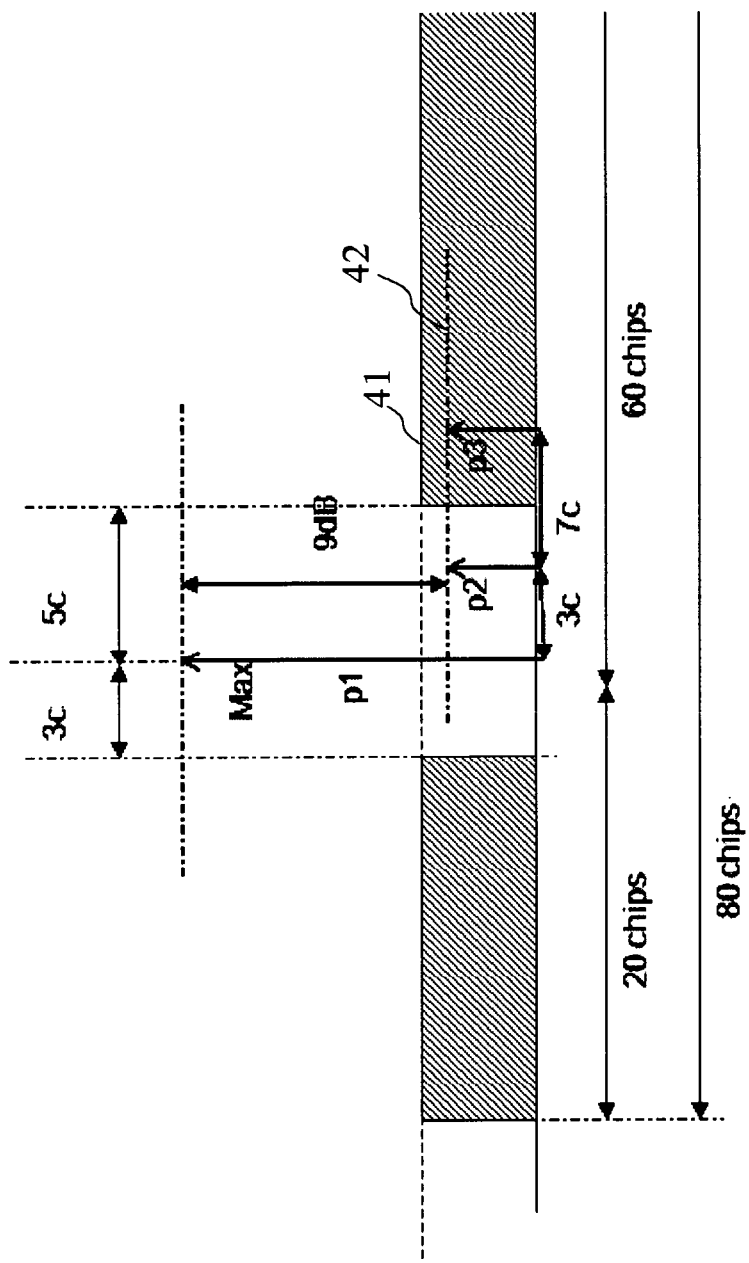
FIG. 4 illustrates the implementation of the process according to the invention in a procedure of test.
Figure 5:
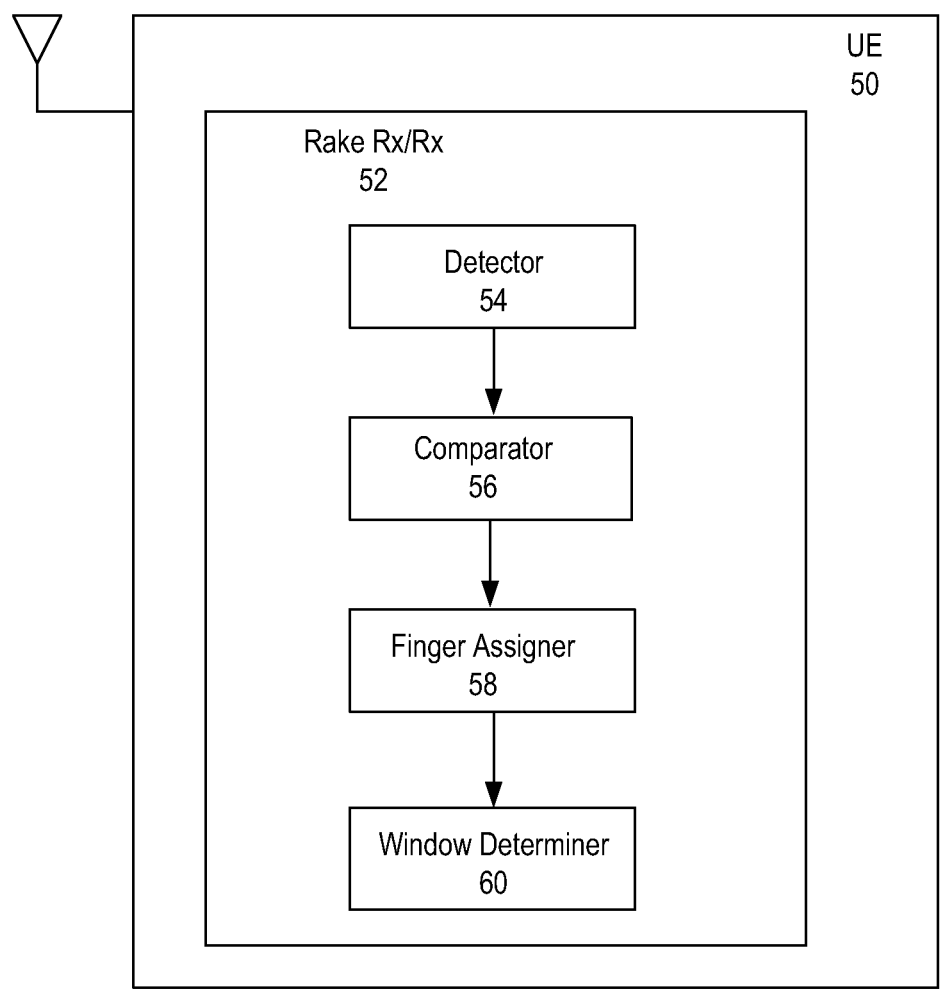
FIG. 5 illustrates exemplary user equipment.

In reference to FIG. 4, one illustrates the implementation of the process of the invention. It is seen that the research of the propagation path is carried out during one period corresponding to 80 chips, ie 60 chips+20 chips, during which three ways of propagation, P1, P2 and P3 respectively, are illustrated. The dark zone delimits the value of the first threshold used (represented by reference 41) which, if it was used alone, it would only allow the detection of path P1.

It is seen that an observation window of 8 chips is defined around path P1, more precisely comprising a duration of 3 chips before P1 and a duration of 5 chips after P1.

The second threshold value is represented by the reference 42 and one sees, on the diagram of FIG. 4, that thanks to the fenestration implemented at the time of the step 24, the path propagation P2 is likely to be detected while the path propagation P3—which though presents the same power—will not be detected.

Thus, the effectiveness of the process is noted.

Incidentally, the diagram of FIG. 4 provides the principle of a procedure of test allowing to highlight the use of the process described.

The invention claimed is:

1. A method, performed by a wireless communication device, of limiting finger assignment in a rake receiver to fewer than the number of multi-path signals received by the device, comprising:
    detecting a first pilot signal;
    comparing the energy of the first pilot signal to a first threshold value;
    detecting, on the basis of the first threshold value, a first significant path for a wireless signal;
    assigning the first significant path to a first finger of the rake receiver;
    determining only a single observation window that is fixed around the first significant path, wherein the observation window has a predetermined length and starts at a predetermined duration prior to the first significant path;
    within the observation window, applying a second threshold value, distinct from and lower than the first threshold value, to detect secondary paths of the first pilot signal; and
    assigning any detected secondary paths of the first pilot signal that are within the observation window and at least the second threshold value to fingers of the rake receiver; and
    determining to not detect any secondary paths of the first pilot signal that fall outside the observation window.

2. The method of claim 1 wherein the first pilot is detected on a Common Pilot Channel (CPICH).

3. The method of claim 1 wherein the wireless communication device is a cell phone.

4. The method of claim 1 wherein the wireless communication device is Portable Digital Assistant (PDA).

5. A limited rake receiver for a wireless communication device comprising:
    a pilot detector operative to detect a first pilot signal;
    a comparator operative to compare the energy of the first pilot signal to a first threshold value;
    a path detector operative to detect, on the basis of the comparison to the first threshold value, a first significant path;
    a finger assigner operative to assign the first significant path to a first finger of the rake receiver;
    a window determiner operative to determine only a single observation window that is fixed around the first significant path, wherein the observation window has a predetermined length and starts at a predetermined duration prior to the first significant path;
    wherein the path detector is further operative to detect secondary paths of the first pilot signal based on a second threshold value lower than the first threshold value during the observation window;
    wherein the finger assigner is further operative to assign any detected secondary paths of the first pilot signal that are within the observation window and at least the second threshold value to fingers of the rake receiver; and
    wherein the finger assigner is further operative to determine to not detect any secondary paths of the first pilot signal that fall outside of the observation window.

6. The receiver of claim 5 wherein the pilot detector is operative to detect the first pilot on a Common Pilot Channel (CPICH).

7. User Equipment operative in a wireless communication network, comprising:
   a rake receiver having a plurality of fingers;
   a pilot detector operative to detect a first pilot signal;
   a comparator operative to compare the energy of the first pilot signal to a first threshold value;
   a path detector operative to detect, on the basis of the comparison to the first threshold value, a first significant path;
   a finger assigner operative to assign the first significant path to a first finger of the rake receiver;
   a window determiner operative to determine only a single observation window that is fixed around the first significant path, wherein the observation window has a predetermined length and starts at a predetermined duration prior to the first significant path;
   wherein the path detector is further operative to detect secondary paths of the first pilot signal based on a second threshold value lower than the first threshold value during the observation window;
   wherein the finger assigner is further operative to assign any detected secondary paths of the first pilot signal that are within the observation window and at least the second threshold value to fingers of the rake receiver; and
   wherein the finger assigner is further operative to determine to not detect any secondary paths of the first pilot signal that fall outside of the observation window.

8. The user equipment of claim 7 wherein the pilot detector is operative to detect the first pilot on a Common Pilot Channel (CPICH).

9. The user equipment of claim 7, wherein the window determiner is further configured to limit the size of the single observation window to reduce a power consumption of the user equipment.

10. The user equipment of claim 7, wherein the window determiner is further configured to limit the size of the single observation window to exclude a secondary path.

* * * * *